US007379915B1

(12) United States Patent
Tomoyuki et al.

(10) Patent No.: US 7,379,915 B1
(45) Date of Patent: May 27, 2008

(54) ELECTRONIC PURSE LOAN SYSTEM

(75) Inventors: Nonaka Tomoyuki, Yokohama (JP); Kenji Matsumoto, Yokohama (JP); Shigeyuki Itoh, Kawasaki (JP); Masayuki Inoue, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/425,302

(22) Filed: Oct. 25, 1999

Related U.S. Application Data

(63) Continuation of application No. 08/690,358, filed on Jul. 26, 1996, now Pat. No. 5,991,747.

(30) Foreign Application Priority Data

Aug. 2, 1995 (JP) ............................... P07-197573

(51) Int. Cl.
G06Q 40/00 (2006.01)
(52) U.S. Cl. .......................................... 705/41; 705/35
(58) Field of Classification Search .................. 705/35, 705/41; 235/380, 379
See application file for complete search history.

(56) References Cited

U.S. PATENT DOCUMENTS

| 4,001,550 | A | * | 1/1977 | Schatz | 235/61 |
| 4,068,213 | A | | 1/1978 | Nakamura | 340/149 |
| 4,179,064 | A | | 12/1979 | Yoshioka | 235/381 |
| 4,614,861 | A | | 9/1986 | Pavlov | 235/380 |
| 4,731,575 | A | | 3/1988 | Sloan | 364/113 |
| 4,864,109 | A | | 9/1989 | Minematsu | 235/379 |
| 4,906,828 | A | * | 3/1990 | Halpern | 235/379 |
| 4,963,722 | A | * | 10/1990 | Takeuchi | 235/382.5 |
| 5,140,517 | A | * | 8/1992 | Nagata et al. | 705/41 |
| 5,155,342 | A | | 10/1992 | Urano | 235/380 |

(Continued)

FOREIGN PATENT DOCUMENTS

AU          9459280 A      4/1994

(Continued)

OTHER PUBLICATIONS

Business Communications Company "Smart Code—New Diectiosn" -Jul. 1996.*

(Continued)

*Primary Examiner*—Hani M. Kazimi
*Assistant Examiner*—Thu-Thao Havan
(74) *Attorney, Agent, or Firm*—Mattingly, Stanger, Malur & Brundidge, P.C.

(57) ABSTRACT

When the amount of a loan of the user of an IC card is written to a personal information storage provided in a center and when the IC card is inserted into the slot of an electronic purse terminal at the time of a current transaction, the amount of the loan stored in the personal information storage is cleared and this loan is paid. The balance stored in the sum information storage of the IC card is updated by this payment and is stored as the current balance in the sum information storage. If the balance is more than the charge for a transaction, the transaction is carried out and if the balance is less than the charge for the transaction, the transaction is performed by obtaining a new loan. The amount of this new loan is stored in the personal information storage.

41 Claims, 12 Drawing Sheets

U.S. PATENT DOCUMENTS

| | | | |
|---|---|---|---|
| 5,172,398 A | 12/1992 | Simons | 377/13 |
| 5,214,269 A | 5/1993 | Yamashita et al. | 235/379 |
| 5,350,906 A | 9/1994 | Brody | 235/379 |
| 5,352,876 A | 10/1994 | Watanabe | 235/381 |
| 5,428,684 A | 6/1995 | Akiyama et al. | 380/25 |
| 5,461,217 A * | 10/1995 | Claus | 235/380 |
| 5,557,516 A | 9/1996 | Hogan | 364/406 |
| 5,590,038 A * | 12/1996 | Pitroda | 705/41 |
| 5,596,643 A * | 1/1997 | Davis | 380/4 |
| 5,637,845 A * | 6/1997 | Kolls | 235/381 |
| 5,640,306 A * | 6/1997 | Gaumet | 361/737 |
| 5,644,118 A | 7/1997 | Hayashida | 235/379 |
| 5,773,804 A * | 6/1998 | Baik | 235/379 |
| 5,789,733 A * | 8/1998 | Jachimowicz et al. | 235/492 |
| 5,936,221 A * | 8/1999 | Corder et al. | 235/380 |

FOREIGN PATENT DOCUMENTS

| | | |
|---|---|---|
| EP | 666549 A1 | 9/1995 |
| EP | 724238 A1 | 7/1996 |
| JP | 392966 | 4/1991 |
| JP | 4362777 | 12/1992 |
| JP | 785228 | 3/1995 |

OTHER PUBLICATIONS

LA times—Aug. 9, 1993—1st toll Road with Big Sales Picth col. 1b 5 p. 1.*

* cited by examiner

FIG. 2(a)

| ID NUMBER | CONTENTS OF LOAN ||
|---|---|---|
| | SUM | DATE |
| | | |
| | | |
| ⋮ | ⋮ | ⋮ |
| | | |

FIG. 2(b)

| ID NUMBER | CONTENTS OF LOAN ||
|---|---|---|
| | SUM | DATE |
| | | |
| | | |
| ⋮ | ⋮ | ⋮ |
| | | |

FIG. 5

| ID NUMBER | CONTENTS OF LOAN | | |
|---|---|---|---|
| | MAXIMUM SUM | SUM | DATE |
| | | | |
| | | | |
| ⋮ | ⋮ | ⋮ | ⋮ |
| | | | |

| ID NUMBER | ENTRAINED STATION CODE | CONTENTS OF LOAN | |
|---|---|---|---|
| | | SUM | DATE |
| | | | |
| | | | |
| ⋮ | ⋮ | ⋮ | ⋮ |
| | | | |

60, 111, 61, 62, 110

ELECTRONIC PURSE LOAN SYSTEM

This patent application is a continuation of U.S. patent application Ser. No. 08/690,358 filed on Jul. 26, 1996 (now U.S. Pat. No. 5,991,747).

BACKGROUND OF THE INVENTION

The present invention relates to an electronic purse loan system or POS terminal for storing loan data relating to a shortage in the amount of a payment to a center and for effecting a processing to clear off a loan amount in the next transaction when a commercial transaction is performed using the electronic purse loan system or POS terminal.

If a commercial transaction is performed using a prepaid card of the type which is in widespread use at the present time, such as a telephone card, the above-described system operates to inhibit a commercial transaction involving use of the card at that time when the total consumed amount reaches or exceeds the sum stored in the card.

In addition, an electronic purse system has been developed in which a transaction is performed by recording information concerning the charges for transaction in an IC card, for example; however, in such an electronic purse system, a transaction may be performed only to the extent of the sum payable from an electronic purse, as described in Japanese published unexamined patent application No. H3-92966. That is, if the balance stored in the IC card is less than the amount of the transaction, the user of the electronic purse is informed that the balance is short and is urged to select whether the transaction is to be stopped, the amount to be paid using the IC card is to be changed or another transaction method, such as a regular credit card, is to be used to perform a flexible transaction.

Since the above-described prepaid card is usable only for payment for a specific service, a card for the amount of money corresponding to the service is prepared beforehand. Therefore, there are few occasions on which the balance is short. However, in the above-described electronic purse system, there is a great possibility that a shortage in the balance will occur at the time of payment due to the user forgetting to pay into his own electronic purse, and the shortage of a required amount to be paid for a transaction occurs because an electronic purse is utilized in many diverse fields. Therefore, in an electronic purse system, the balance in an IC card can be checked at any time using a portable balance display and other means, however, if the balance is short at the time of a transaction, the transaction using the electronic purse is not permitted.

OBJECTS OF THE INVENTION

The object of the present invention is to provide an electronic purse system in which a transaction is not prevented due to a shortage in the balance held in the IC card even if the user of the electronic purse system forgets to pay into his account for his or her IC card or even during a time of sharing service. Another object of the present invention is to enable correspondence only by the electronic purse system without using another transaction method, such as cash and a credit card, as required heretofore, as a method of avoiding the suspension of a transaction.

SUMMARY OF THE INVENTION

To achieve the above-described objects, an electronic purse loan system according to the present invention comprises an IC card provided with a storage for storing an ID number and electronic money information, an IC card reading/writing unit for reading information from the IC card or writing information to the IC card, an input device for inputting a numeric value, an electronic purse terminal provided with a communication control unit for sending or receiving data via a public telephone network, a personal information storage for storing the ID number of the IC card and the information of a loan sum, a correlating device for correlating the ID number of an IC card and the information of the loan sum stored in the personal information storing means, a data bank for storing data, such as a movie, and an information center provided with a communication control unit for sending or receiving data from the data bank via the public telephone network.

If the balance indicated by the electronic money information of an IC card is less than the amount of a charge when the data stored in the data bank is read, the processing for a loan is performed by storing the total or a part of the charge in the personal information storing means as information of a loan sum, only if its ID number is verified by correlating the ID number read from the IC card using the correlating device and the user indicates a desire for a loan via the input means.

Therefore, if the shortage in the balance carried by an IC card occurs at the time of payment using the electronic purse system, the processing for a loan can be immediately performed by storing the sum of a loan in the center or a POS terminal as information for a person whose ID number is cataloged, and the suspension of a transaction or the need to change to another transaction method, such as cash and a credit card, can be avoided. Heretofore, if the shortage in the balance carried by an IC card occurred at the time of payment, the transaction was stopped or payment by another transaction method, such as cash and a credit card, was required; however, according to the present invention, the processing for a loan can be immediately performed by the electronic purse system by storing information indicating the sum of a loan in the center or a POS terminal as information for a person whose ID number is cataloged, thereby adding a function for a loan to the electronic purse system, so that suspension of the transaction, or a change to another transaction method, can be avoided and a perfect cashless commercial transaction using only the electronic purse system can be realized.

BRIEF DESCRIPTION OF THE DRAWINGS

The features of the present invention will be more apparent from the following detailed description, when taken in conjunction with the accompanying drawings, in which:

FIGS. 2(a) and 2(b) are diagrams of examples of a personal information storage in the electronic purse loan system shown in FIG. 1.

FIG. 5 is a diagram which shows another example of the personal information storage in the electronic purse loan system shown in FIG. 1.

FIG. 10 is a diagram which shows a concrete example of a personal information storage in the electronic purse loan system shown in FIG. 9.

DETAILED DESCRIPTION OF PREFERRED EMBODIMENTS

Various embodiments according to the present invention will be described below with reference to the drawings.

Figure 1:
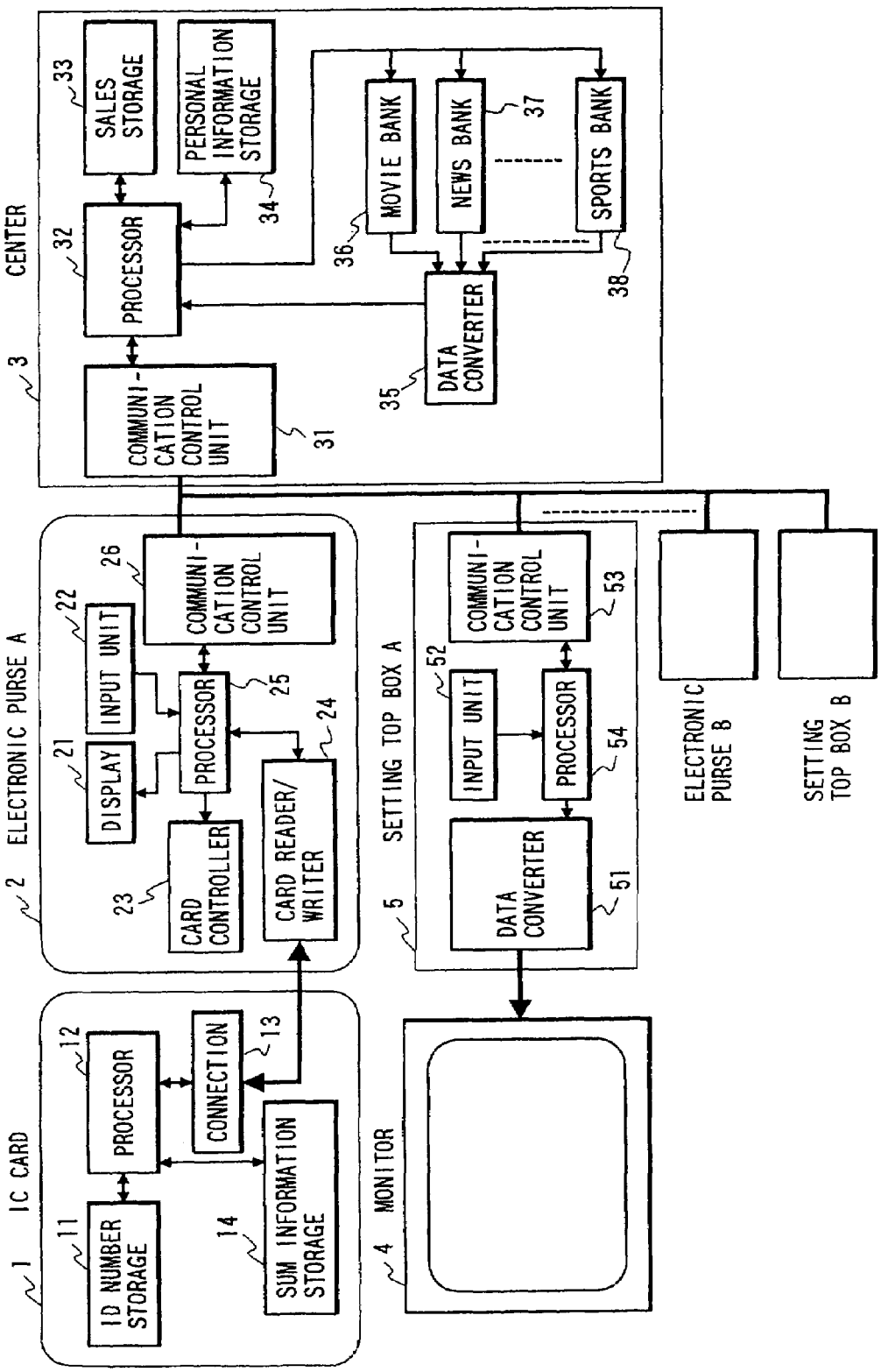
FIG. 1 is a block diagram showing an embodiment of an electronic purse loan system according to the present invention.

FIG. 1 is a block diagram showing a first embodiment of an electronic purse loan system according to the present invention, including an IC card 1, an electronic purse terminal 2, a center 3, a monitor 4, and a setting top box 5. The IC card includes an ID number storage 11, a processor 12, a connection 13, and a sum information storage 14. The electronic purse 2 includes a display 21, an input unit 22, a card controller 23, a card reader/writer 24, a processor 25, and a communication control unit 26. The center 3 includes a communication control unit 31, a processor 32, a sales storage 33, a personal information storage 34, a data converter 35, a movie bank 36, a news bank 37 and a sports bank 38. The setting top box 5 includes a data converter 51, a setting top box input unit 52, a communication control unit 53 and a processor 54.

FIGS. 2(*a*) and 2(*b*) represent examples of the personal information storage 34 shown in FIG. 1. A reference number 60 denotes an ID number storage, 61 denotes a loan storage and 62 denotes a loan date storage. The example shown in FIG. 2(*a*) is for a case where a loan is given one ID number, and the example shown in FIG. 2(*b*) is for a case where a loan is given a plurality of ID numbers. The latter is for a group, such as a family.

Figure 3:
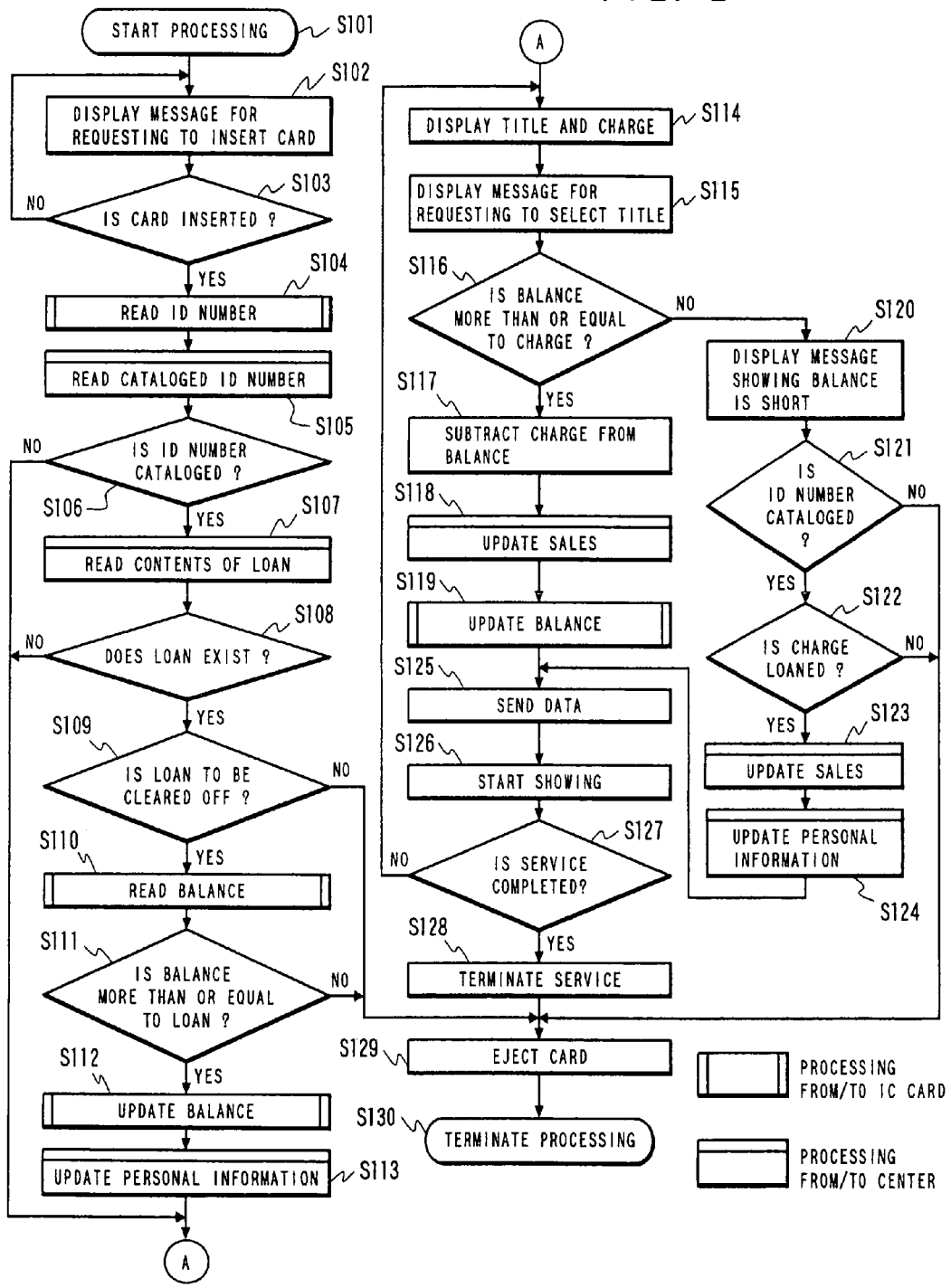
FIG. 3 is a flowchart showing a concrete example of the basic operation in the electronic purse loan system shown in FIG. 1.

FIG. 3 is a flowchart showing an example of the basic processing carried out by this embodiment.

In this embodiment, service data, such as a movie, news and a sports event is read from the center via a telecommunication line, such as a public telephone network, and the charge for the service is paid using an electronic purse system.

The constitution and the processing shown in FIGS. 1 and 3 are based on the premise that the owner of an IC card 1 should pay the charge for a movie by electronic money transfer. The system in this embodiment is placed in a state where it is waiting for the input of an IC card 1 to be inserted into a slot of the electronic purse terminal 2, and, when that occurs, a message to that effect is displayed on the display 21 of the electronic purse terminal 2 as a result of the processing in a step S102.

When the user inserts his/her IC card into the slot of the electronic purse terminal 2, the IC card movement is controlled by the card controller 23 of the electronic purse terminal 2, so that the connection 13 of the IC card 1 is connected to the card reader/writer 24 of the electronic purse terminal 2, and the electronic purse terminal 2 verifies that an IC card 1 has been inserted, in a step S103.

When it is verified that an IC card 1 has been inserted, it is first checked to determine whether the owner of the IC card 1 is a cataloged member of the center 3. For that purpose, an ID number proper to the IC card, as stored in the ID number storage 11 of the IC card 1, is read by the card reader/writer 24 in the electronic purse terminal 2 in a step S104, and after this data is processed in the processor 25, it is supplied to the processor 32 of the center 3 via the communication control unit 26 of the electronic purse terminal 2 and the communication control unit 31 of the center 3. The cataloged ID numbers are read from the ID number storage 60 shown in FIG. 2(*a*) in the personal information storage 34 in the center 3 in a step S105, and the ID number stored in the IC card 1 is correlated with the cataloged ID numbers to determine whether the ID number stored in the IC card 1 is cataloged in the center 3 in a step S106. When it is verified that the ID number stored in the IC card identifies a cataloged member, a function for obtaining a loan is usable; however, if the ID number stored in the IC card does not identify a cataloged member, the function for obtaining a loan cannot be used, and only a normal transaction using electronic money transfer is allowed, and processing proceeds to a step S114.

If the function for obtaining a loan at the center 3 is used to pay the charge for the last service on behalf of the cataloged member, the member cannot receive the next service until the charge for the last service has been cleared off by the member. Therefore, the contents of information for this member as stored in the personal information storage 34 in the center 3 are referred to in a step S107, and it is checked to determine whether a loan exists in connection with the last transaction in a step S108. As a result, if no loan exists, processing proceeds to the step S114 for a normal procedure for payment.

If it is verified in the step S108 that a loan still exists, the sum of the current loan is displayed on the display 21 of the electronic purse terminal 2, a message which urges the member to select whether the loan is to be cleared off is also displayed, and the owner of the IC card 1 selects either choice via the input unit 22 of the electronic purse terminal 2 in a step S109. If clearing of the loan is selected, the balance stored in the sum information storage 14 of the IC card 1 is read by the card reader/writer 23 in the electronic purse terminal 2 in a step S110 and is compared with the loan amount stored in the loan amount storage 61 shown in FIG. 2 in the personal information storage 34 in the center 3 by the processor 32 in a step S111.

If the balance carried by the IC card is more than the loan amount, the loan amount is subtracted from the balance by the processor 32 and a new balance is written into the sum information storage 14 of the IC card 1 by the card reader/writer 24 in a step S112. The loan amount storage 61 and the loan date storage 62, respectively, shown in FIG. 2(*a*) in the personal information storage 34 in the center 3 are updated in a step S113.

Clearing off of the loan undertaken in the last transaction is completed by the above-described steps and processing proceeds to the procedure for the next service. If the loan is not cleared off in the step S109, or if the balance is indicated as being short in the step S111, the next service cannot be received, the IC card 1 is ejected from the electronic purse terminal 2 by the card controller 23 in a step S129 and the processing is ended in a step S130.

If it is found that the owner of the IC card is not a cataloged member in the step S106, or that no loan exists in the step S108 even if the owner is a cataloged member, when processing proceeds as far as the above-described step S113, first the identification of a variety of services, such as a movie, news and a sports event, which this system can provide are displayed on the monitor 4 and the user can select his/her desired service on the input unit 52 of the setting top box 5. For example, when a movie is selected, the titles of movies and the charge therefor are displayed in a step S114, and the user selects the title of his/her desired movie on the input unit 52 in a step S115.

When a title has been selected, the balance stored in the sum information storage 14 of the IC card 1 is read by the card reader/writer 24 and is compared with the charge for this selected movie by the processor 32 of the center 3 in a step S116. As a result, if the balance is more than or equal to the charge, the charge is subtracted from the balance by the processor 32 in a step S117, the amount is added to the sales storage 33 in a step S118, the balance stored in the sum information storage 14 of the IC card 1 is updated by the card reader/writer 24 and the payment for the charge is completed in a step S119.

Then, the data for the movie selected from the movie bank 36 is read and converted by the data converter 35, and the video is sent to the processor 32 of the center 3 and is transferred to the setting top box 5 via the communication control unit 31. The data is fetched in the setting top box 5 via the communication control unit 53, movie data is converted by the data converter 51 in a step S125 and the movie is presented on the monitor 4 in a step S126.

If the balance is found to be less than the charge for the selected movie in the step S116, a message showing that the balance carried by the IC card is short is displayed on the display 21 of the electronic purse terminal 2 in a step S120. And, it is checked again to determine whether the ID number of the user of the IC card 1 is cataloged or not in a step S121; and, as a result, when it is verified that the user is a cataloged member, a message which urges the user to select whether he/she would like to have a loan is displayed on the display 21 and the user is urged to select either choice in a step S122.

If the user indicates a desire to have a loan on the electronic purse input unit 22 in the step S122, the charge is added to the sales storage 33 in the center 3 in a step S123, the amount of the loan is stored in the loan amount storage 61 shown in FIG. 2 and the loan date is stored in the loan date storage 62 shown in FIG. 2(a), respectively, in the personal information storage 34 in a step S124. In this case, the total charge is processed as the amount of the loan. Payment is effected by this procedure and the presentation of the desired movie is started in steps S125 and S126.

If the user is found to be not a cataloged member in the step S121, or if the user elects not to have a loan on the electronic purse input unit 22 in the step S122, even if he/she is a cataloged member, the user cannot receive the selected movie and his/her IC card 1 is ejected from the electronic purse terminal 2 by the card controller 23 in a step S129.

When the movie is finished, a message which urges the user to indicate whether the service is to be terminated or another movie is to be selected is displayed on the monitor 4 in a step S127. When the user selects another movie on the input unit 52 of the setting top box 5, processing is returned to a state in which the titles of the movies and the charge therefor are displayed on the monitor 4 in the step S114, and if the user pays the charge, he/she can enjoy another movie.

When the user elects to end the service on the setting top box input unit 52 in the step S127, the service is terminated in a step S128 and his/her IC card 1 is ejected from the electronic purse terminal 2 by the card controller 23 in the step S129.

An IC card 1 may be provided with a loan sum storage to correlate the data of a loan amount read from each IC card by the card reader/writer 24 with the data stored in the center 3. The total charge may be loaned or the amount in which the balance is short may be loaned. In the latter case, the balance stored in the sum information storage 14 of an IC card 1 is required to be updated.

In the above-described embodiment, in case a plurality of ID numbers in a family are grouped in the personal information storage 34, as shown in FIG. 2(b), and are stored in the center 3 as group information, a member of the group can clear off the loan given to another member. Therefore, the charge for the movies enjoyed by a child can be paid for by his/her parent in a lump sum.

In the above-described embodiment, the electronic purse terminal 2 and the setting top box 5 are separate, however, the electronic purse system may be built into the setting top box.

Figure 4:
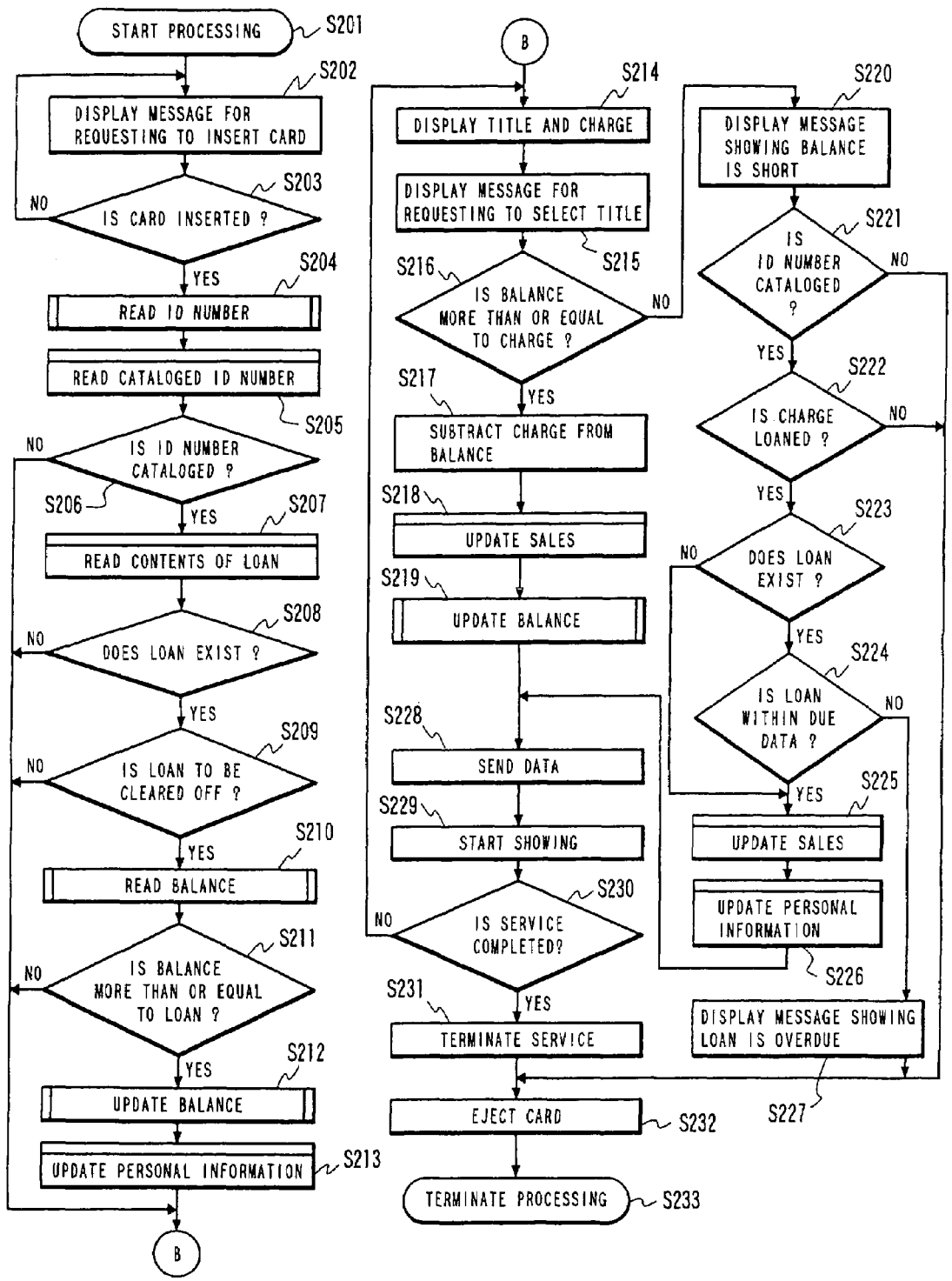
FIG. 4 is a flowchart showing another concrete example of the basic operation in the electronic purse loan system shown in FIG. 1.

Next, the processing in this embodiment for a case wherein the term for repayment is determined will be described. FIG. 4 is a flowchart showing the basic processing for payment in accordance with this embodiment in which the term for repayment is determined for a loan.

As shown in FIGS. 1 and 4, when an IC card 1 is inserted into the slot of an electronic purse terminal 2, which is in the state of waiting for an input in steps S202 and S203 if the owner of the IC card 1 pays the charge for a service by electronic money transfer, the IC card 1 is inserted by the card controller 23 in the electronic purse terminal 2 and the connection 13 provides for connection of the IC card 1 to the card reader/writer 24.

The electronic purse terminal 2 verifies that the IC card 1 has been inserted in the step S203 and first checks to determine whether the owner of this IC card 1 is a cataloged member of the center 3.

That is, the ID number proper to this IC card, as stored in the ID number storage 11 of the IC card 1, is read by the card reader/writer 24 in a step S204, and, after it is processed in a processor 25 in the electronic purse terminal 2, it is supplied to the processor 32 of the center 3 via the communication control unit 26 of the electronic purse terminal 2 and the communication control unit 31 of the center 3. The cataloged ID numbers are read from an ID number storage 60 shown in FIG. 2(a) in a personal information storage 34 in the center 3 in a step S205, and it is checked to determine whether the ID number is cataloged in the center 3 by correlating the ID number read from the IC card 1 with the cataloged ID numbers from the personal information storage 34 in a step S206. If the ID number is cataloged in the center 3, a loan is permissible, however, if it is not a cataloged member, a loan cannot be obtained, and only a normal transaction is enabled and processing proceeds to a step S214.

If the charge for the last service is paid utilizing a loan from the center 3 when the ID number is found to belong to a cataloged member, clearing of a prior loan is required; however, in this embodiment, if the date of the transaction is within the period prior to the date that the loan is to be repaid, a further loan can be given, even if the above-described prior loan is not cleared off.

In a step S207, the user's former transactions are checked referring to the contents of a loan date storage 62 shown in FIG. 2 in the personal information storage 34 in the center 3, and, as a result, if the user has no existing loan in a step S208, processing proceeds to the step S214 for a normal procedure.

If it is determined that the user has an existing loan relating to the last charge in the step S208, the sum of the former loan is displayed on the display 21 of the electronic purse terminal 2 and the user is urged to select whether he/she intends to clear off the loan in a step S209. If the balance stored in the sum information storage 14 of the IC card 1 is more than the loan, the loan can be cleared off; however, if the balance is short or if clearing is not required, the user can refuse to pay off the loan. In this case, processing proceeds to the step S214.

If clearing of the loan is selected in the step S209, the balance stored in the sum information storage 14 of the IC card 1 is read by the card reader/writer 24 of the electronic purse terminal 2 in a step S210 and is compared with the sum of the loan stored in the loan amount storage 61 shown in FIG. 2(a) in the personal information storage 34 in the center 3 by the processor 32 in a step S211. If the balance carried by the IC card is more than the amount of the loan, the loan amount is subtracted from the balance by the processor 32, a new balance is written into the sum information storage 14 of the IC card 1 by the card reader/writer 24 of the electronic purse terminal 2 in the step S212 and the amount of the loan stored in the loan amount storage 61 shown in FIG. 2 and the loan date stored in the loan date storage 62 shown in FIG. 2(a), respectively, in the personal information storage 34 in the center 3 are reset in the step S213.

Clearing of the former transaction is completed by the above-described steps and processing proceeds to a procedure for the current service. If the former loan is not cleared off in the step S209 or if the balance is short in the step S211, a new service still may be provided without clearing off the loan.

In this regard, the contents of services and the charge are displayed on the monitor 4 in the step S214 and the user selects his/her desired service on the input unit 52 of the setting top box 5 in a step S215.

When a service has been selected, as described above, the balance stored in the sum information storage 14 of the IC card 1 is read by the card reader/writer 24 and sent to the processor 32 of the center 3 where the balance is compared with the charge for the service in a step S216. As a result, if the balance is more than the charge, the charge is subtracted from the balance by the processor 32 in a step S217 and is added to the sales storage 33 by the processor 32 in a step S218. The balance stored in the sum information storage 14 of the IC card 1 is updated by the card reader/writer 24 of the electronic purse terminal 2 in a step S219.

Hereby, payment is completed, the data is transferred to the setting top box 5 in a step S228 and service is started in a step S229.

If the balance is determined to be less than the charge in the step S216, the shortfall is displayed on the display 21 of the electronic purse terminal 2 in a step S220. The ID number is referred to again and it is checked to determine whether the number is assigned to a cataloged member in a step S221. As a result, if the ID number is assigned to a cataloged member, a message which urges the user to select whether the user would like to take out a loan is displayed on the display 21 of the electronic purse terminal 2 in a step S222.

If the user indicates the desire for a loan on the input unit 22 of the electronic purse terminal 2 in a step S222, data stored in the loan date storage 62 shown in FIG. 2 in the personal information storage 34 in the center 3 is read to check whether the user has an existing loan in a step S223, and if the user has no loan at present, processing proceeds to a step S225 so as to give the user a loan immediately.

If the user is given a loan in the step S223 and the date is within the term of repayment set by the center 3, for example the 28th of every month in a step S224, the charge is added to the sales storage 33 by the processor 32 of the center 3 in a step S225, and the loan amount storage 61 and the loan date storage 62, shown in FIG. 2(a), in the personal information storage 34 are updated in a step S226.

Payment by loan is completed by this procedure, processing proceeds to the step S228 and service is started in the step S228.

In this case, the total charge may be loaned or only the shortfall may be loaned.

If the term for repayment is over, a message informing the user that the term for repayment is over is displayed on the display 21 of the electronic purse terminal 2 in a step S227, and the user cannot receive service as a non-cataloged member or a user who selects that he/she has no current loan on the input unit 22 of the electronic purse terminal 2, with a result that the IC card 1 is ejected from the electronic purse terminal 2 by the card controller 23 in a step S232.

When the service is completed, a message which urges the user to select whether service is to be ended or a new service is to be provided is displayed on the monitor 4 in a step S230. If the user indicates that he/she would like to receive a new service on the input unit 52 of the setting top box 5, processing is returned to the state in which the contents of services and the charge are displayed on the monitor 4 in the step S214, and when payment is made the user can receive a new service.

If the user indicates that service is to be ended on the input unit 52 of the setting top box 5 in the step S230, service is terminated in the step S231 and the IC card 1 is ejected from the electronic purse terminal 2 by the card controller 23 in the step S232. Thus, a series of processings is completed in a step S233.

In this embodiment, repayment may be set for payment in monthly installments and charges can be loaned many times within the term for repayment, however, a repayment term storage may be provided in the personal information storage 34 in the center 3, and it may be set so that charges can be loaned many times within the term for repayment set according to the number of days from the day of the first loan.

Next, the processing in this embodiment in the case where the upper limit of a loan is determined will be described.

FIG. 5 shows an example of the personal information storage 34 in FIG. 1 in which the upper limit of a loan is stored. In FIG. 5, a reference number 60 denotes the ID number storage, 71 denotes a loan upper limit storage, 61 denotes the loan amount storage and 62 denotes the loan date storage.

Figure 6:
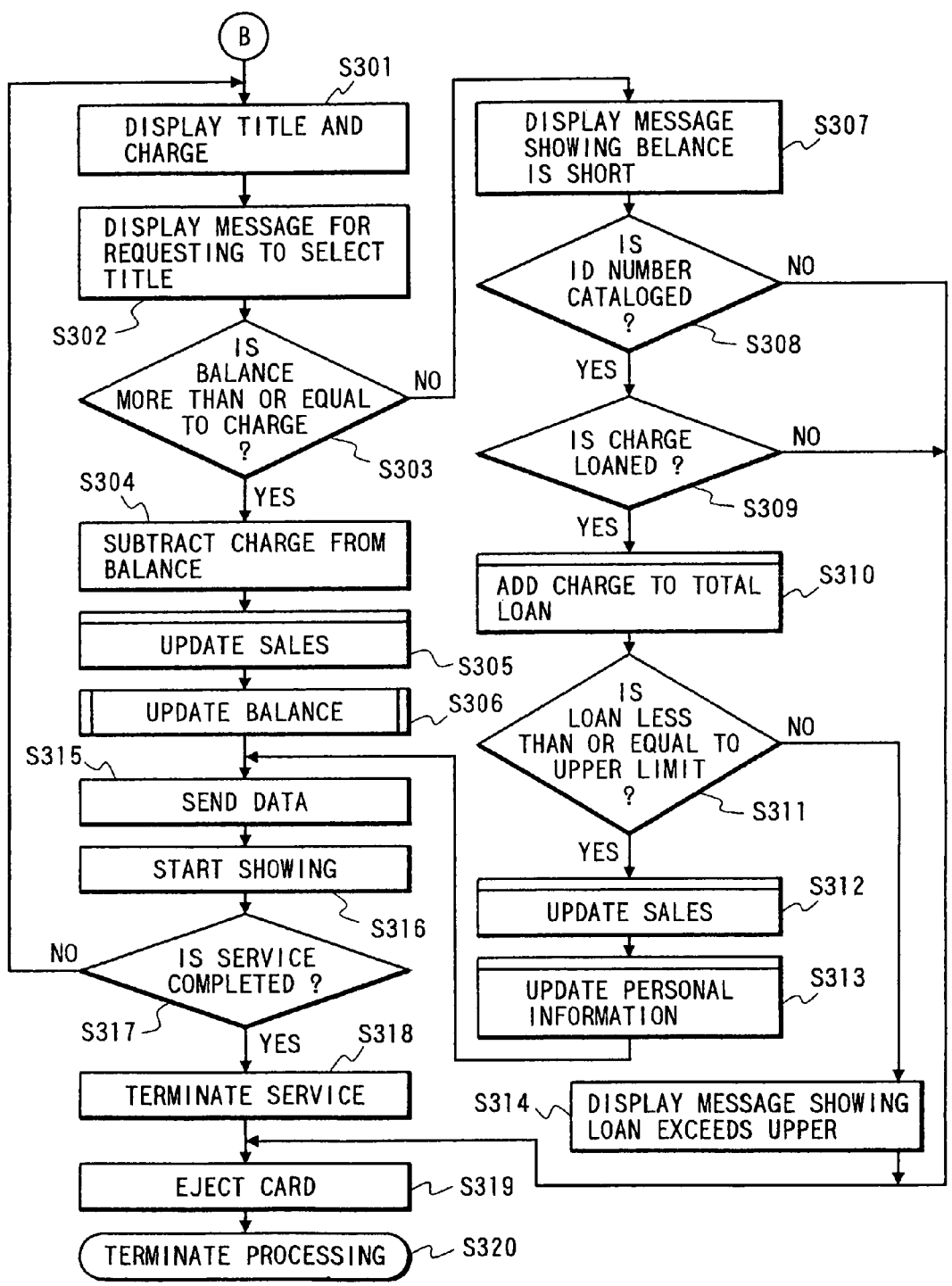
FIG. 6 is a flowchart showing a further example of the basic operation in the electronic purse loan system shown in FIG. 1.

FIG. 6 is a flowchart showing the basic processing when payment is made in accordance with this embodiment provided with a function for giving a loan, the upper limit of which is determined, the upper limit of the loan being stored in the loan upper limit storage 71 in the personal information storage 34 shown in FIG. 5.

In this case, the processing shown in the steps S201 to S213 in FIG. 4 is also used in this embodiment, whereby the loan in the former transaction is cleared off, and after the contents of services and the charge are displayed on the monitor 4 in a step S301, the user selects his/her desired service on the input unit 52 of the setting top box 5 in a step S302.

When the service is selected, the balance stored in the sum information storage 14 of the IC card 1 is read by the card reader/writer 24 in the electronic purse terminal 2 and sent to the processor 32 of the center 3 to compare the balance with the charge in a step S303. As a result, if the balance is more than the charge, the charge is subtracted from the balance by the processor 32 in a step S304, and the balance stored in the sum information storage 14 of the IC card 1 is updated by the card reader/writer 24 in a step S305. The charge is added to the sales storage 33 by the processor 32 in a step S306.

Thus, payment is completed, the data of the selected service is transferred to the setting top box 5 in a step S315 and service is started in a step S316.

If the balance is determined to be less than the charge in the step S303, a message showing that the balance carried by the IC card is short is displayed on the display 21 of the electronic purse terminal 2 in a step S307. A check is again made to determine whether the user is a cataloged member in a step S308, and, if it is verified that the user is a cataloged member, a message which urges the user to select whether he/she desires a loan is displayed on the display 21 of the electronic purse terminal 2 in a step S309.

If the user indicates that he/she elects to obtain a loan through the input unit 22 of the electronic purse terminal 2, the charge for the service is added to the present sum of the current loan stored in the loan amount storage 61 shown in FIG. 5 in the personal information storage 34 in the center 3 and a new sum for the loan is calculated in a step S310. This new sum for the loan and the upper limit of the loan stored in the loan upper limit storage 71, shown in FIG. 5, in the personal information storage 34 are compared by the processor 32 of the center 3 in a step S311, and, as a result, if the loan is less than the upper limit, the charge for the service is added to the sales storage 33 by the processor 32 in a step S312. The amount of the loan stored in the loan amount storage 61, shown in FIG. 5, in the personal information storage 34 in the center 3 is updated in a step S313.

Payment is completed by the above-described procedure and service is started in the step S315.

If it is determined that the user is not a cataloged member in the step S308, or if the user indicates that he/she does not desire a loan through the input unit 22 in the step S309 even if he/she is a cataloged member, he/she cannot receive service and his/her IC card 1 is ejected from the electronic purse terminal 2 by the card controller 23 in a step S319.

If the user's loan exceeds the upper limit in the step S311, a message showing that his/her loan exceeds the upper limit is displayed on the display 21 of the electronic purse terminal 2 in the step S314, and his/her IC card 1 is ejected from the electronic purse terminal 2 by the card controller 23 in the step S319.

When service is completed, a message which urges the user to select whether service is to be terminated or whether a new service is to be provided is displayed on the monitor 4 in the step S317. When the user indicates the desire to receive a new service through the input unit 52 of the setting top box 5, processing is returned to a state in which the contents of services and the charge are displayed on the monitor 4 in the step S301, and when payment has been made, the user can receive the service.

If the user elects to end service through the input unit 52 of the setting top box 5, service is terminated in the step S318 and the user's IC card 1 is ejected from the electronic purse terminal 2 by the card controller 23 in the step S319. Thus, a series of processings is completed in a step S320.

In this embodiment, the upper limit of a loan can be arbitrarily set by providing the loan upper limit storage 71, as shown in FIG. 5, in the personal information storage 34; however, if the upper limit for all loans from the center is set to be equal to the same amount, the need for this loan upper limit storage 71 can be avoided.

A storage for storing the term of repayment and the number of times a loan is given may be provided in the personal information storage 34 in addition to the upper limit loan information to adjust the sum of a loan.

In this embodiment, the total charge is paid by loan, however, if the user does not want to pay the total charge by loan, only the shortfall of the balance may be paid by loan.

The electronic purse loan system, in a case where data from the center, such as a movie, is received via the setting top box has been described above; however, a case where the contents of a game are received via the setting top box may be also considered. In this case, the charge may be required for every game independent of the time, or the charge may be applied for a fixed time period in which games are provided. In the former system, a function for giving a loan can be utilized at the time of clearing, as in the case of a movie. In the latter system, clearing is automatically performed for every fixed time period in which games are provided and only if the balance stored in an IC card is short will a game be temporarily suspended and a function for obtaining a loan be executed.

As described above, even if the balance stored in an IC card is short, when a game is provided based upon payment for a fixed time period of use, the game can be continued owing to the granting of a loan.

Next, an embodiment in case the present invention is used for a POS (point-of-sale) register terminal in a supermarket and other such applications will be described.

Figure 7:
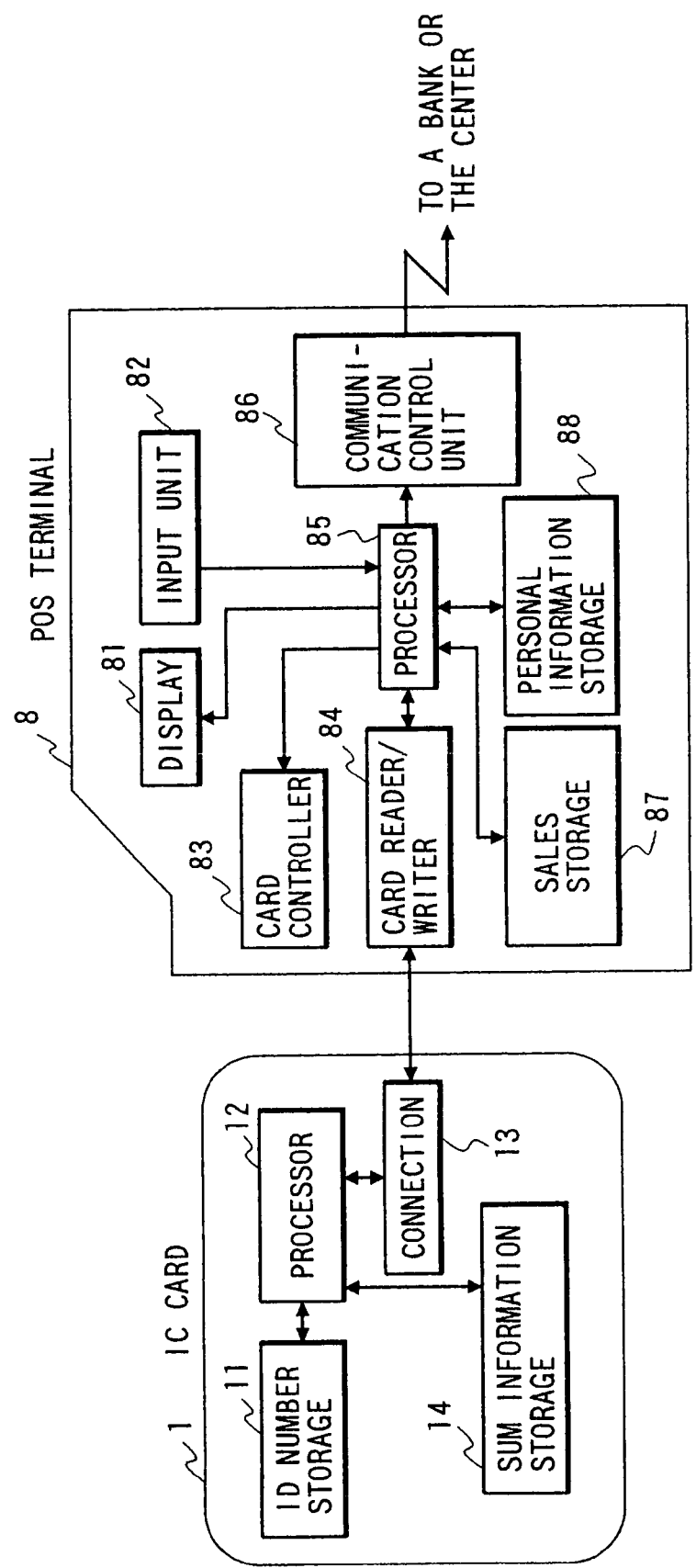
FIG. 7 is a block diagram showing a second embodiment of an electronic purse loan system according to the present invention.

FIG. 7 is a block diagram showing a second embodiment of an electronic purse loan system according to the present invention for use as a POS terminal. The POS terminal a includes a display 81, a POS register keyboard input unit 82, a card controller 83, a card reader/writer 84, a processor 85, a communication control unit 86, a sales storage 87, and a personal information storage 88. The IC card 1 has the same elements, as in the embodiment shown in FIG. 1.

Figure 8:
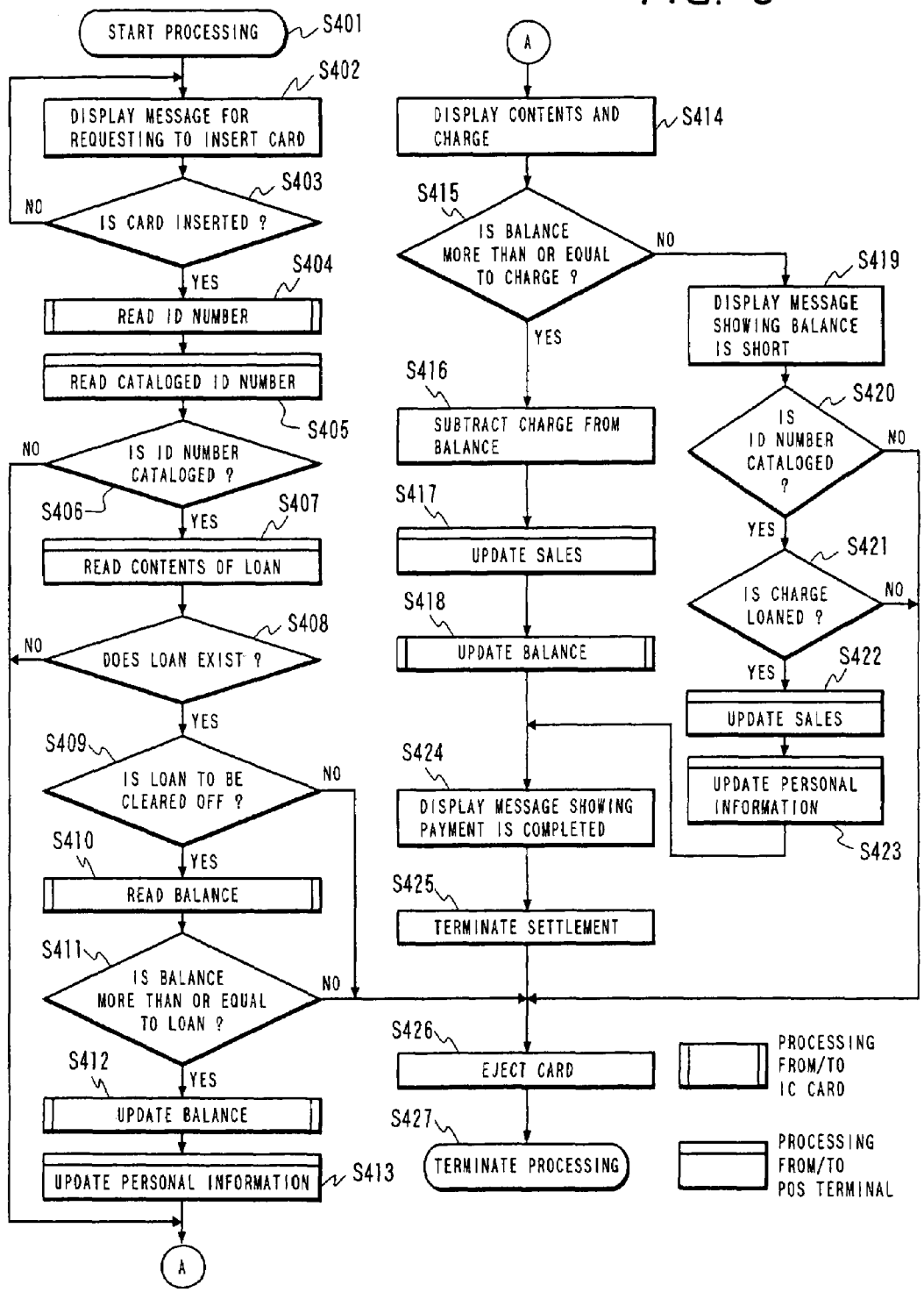
FIG. 8 is a flowchart showing example of the basic operation in the electronic purse loan system shown in FIG. 7.

FIG. 8 is a flowchart showing an example of the basic processing in this embodiment.

When the owner of an IC card 1 inserts the IC card 1 into the slot of the POS terminal 8, which is in a state waiting for an input in steps S402 and S403 to pay the charge for a service or goods by electronic money transfer, it is verified in a step S403 that the IC card 1 has been inserted.

When it is verified that the IC card 1 has been inserted, it is first checked to determine whether the owner of the IC card 1 is a cataloged member eligible for use of the POS terminal 8.

Therefore, the ID number of the IC card, as stored in the ID number storage 11 of the IC card 1, is read by the card reader/writer 84 in the POS terminal 8 in a step S404 and is supplied to the processor 85 of the POS terminal 8. Next, the cataloged ID numbers are read from an ID number storage 60 in the personal information storage 88 (provided with the same constitution as the personal information storage 34 shown in FIG. 2(a) in this embodiment) in the POS terminal 8 in a step S405, and the ID number read from the IC card is correlated with the stored ID numbers to determine whether the ID number of the IC card is cataloged in the POS terminal 8 in a step S406.

Hereby, if it is verified that the ID number of the IC card is cataloged, payment by the loan system is enabled; however, if the ID number is not cataloged, the owner of the IC card cannot utilize the loan system, and only a normal transaction by electronic money transfer or standard credit card is enabled, and processing proceeds to a step S414.

Unless a cataloged member has paid the charge for the last service in which the loan function of the POS terminal 8 was utilized, he/she cannot receive this service without clearing the existing loan. Therefore, the last transaction is checked in a step S408 by referring to the information stored in a loan amount storage 61 and a loan date storage 62 shown in FIG. 2(a) in the personal information storage 88 in the POS terminal 8 in a step S407. As a result, if the owner has no loan, processing proceeds to a step S414 for normal payment.

If it is verified in the step S408 that the owner has a current loan, the sum of the loan is displayed on the display 81 of the POS terminal 8, a message which urges the owner of the IC card 1 to select whether the loan is to be cleared off is displayed there and he/she selects either choice on the POS register keyboard input unit 82 in a step S409. If the owner elects to clear the loan, the balance stored in the sum information storage 14 of the IC card 1 is read by the card reader/writer 84 in the POS terminal 8 in a step S410 and is compared with the sum of the loan stored in the loan amount storage 61 in the personal information storage 88 by the processor 85 in a step S411.

If the balance carried by the IC card is more than the sum of the loan, the sum of the loan is subtracted from the balance by the processor 85 and a new balance is written into the sum information storage 14 of the IC card 1 by the card reader/writer 84 in a step S412. The loan amount storage 61 and the loan date storage 62 in the personal information storage 88 in the POS terminal 8 are reset in a step S413.

Clearing off a loan relating to the last transaction is completed by the above-described procedure and a procedure for providing the current service or goods is started. If a loan is not cleared off in the step S409 or it is found that the balance is short in the step S411, the owner cannot receive service, his/her IC card 1 is ejected from the POS terminal 8 by the card controller 83 in a step S426 and the processing is terminated in a step S427.

If it is found that the owner is not a cataloged member in the step S406, or if he/she has no loan even if he/she is a cataloged member, when processing proceeds to the above-described step S413, first the contents of this service and the charge are displayed on the display 81 of the POS terminal 8 in the step S414. The balance stored in the sum information storage 14 of the IC card 1 is read by the card reader/writer 84 and is compared with the charge for the service or goods by the processor 85 in a step S415. As a result, if the balance carried by the IC card is more than or equal to the charge, the charge is subtracted from the balance by the processor 85 in a step S416, the charge is added to the sales storage 87 in a step S417, the balance stored in the sum information storage 14 of the IC card 1 is updated by the card reader/writer 84 in a step S418, a message showing the completion of payment is displayed on the display 81 of the POS terminal 8 in a step S424 and the payment process is completed in a step S425.

If it is found that the balance stored in the IC card 1 is less than the charge for the service or goods in a step S421, a message showing the balance is short is displayed on the display 81 of the POS terminal 8 in a step S419. It is checked again to determine whether the ID number of the IC card 1 is that of a cataloged member in a step 420. As a result, if the ID number is for a cataloged member, a message which urges the owner to indicate whether he/she desires a loan is displayed on the display 81 in the step S421.

If the owner selects to obtain a loan on the POS register input unit 82 in the step S421, the charge is added to the sales storage 87 in the POS terminal 8 in a step S422, the sum of the loan is stored in the loan amount storage 61 and the loan date is stored in the loan date storage 62 in the personal information storage 88 in a step S423.

The data indicating the sum of a loan may be stored in both the POS terminal 8 and an IC card 1 by providing a loan sum storage in the IC card 1 and storing the sum of a loan in the IC card 1 using the card reader/writer 84. The total charge may be loaned or the shortfall of a balance may be loaned.

A message showing that payment has been completed is displayed on the display 81 of the POS terminal 8 by this procedure in the step S424 and the payment process is ended in the step S425. A non-cataloged member in the step S420, or the user who indicates that he/she wants no loan on the POS register input unit 82 in the step S421, cannot pay the charge for the service or goods and his/her IC card 1 is ejected from the POS terminal 8 by the card controller 83 in the step. S426. In this case, the user is required to stop shopping at the supermarket or to initiate a procedure for payment again after he/she pays the required sum in his/her account for his/her IC card.

When the payment for the charge is completed, the IC card 1 is ejected from the POS terminal 8 by the card controller 83 in the step S426.

Electronic money information read from an IC card 1 is supplied to the sales storage 87 in the POS terminal 8, however, it may be transmitted to a bank and other services via the communication control unit 86.

In this embodiment, the upper limit of a loan and the term of repayment also may be set. This embodiment may be constituted so that a loan and clearing off of a loan are enabled in any POS terminal at the chain stores of a convenience store or a gas station by providing a personal information storage in the center. In such case, personal information, such as the sum of a loan, and electronic money information are transmitted to the center or bank via the communication control unit 86.

Next, an embodiment in a case where the present invention is utilized for an automatic ticket examiner, which is used for payment of the fare for a train or a bus, for example, will be described.

Figure 9:
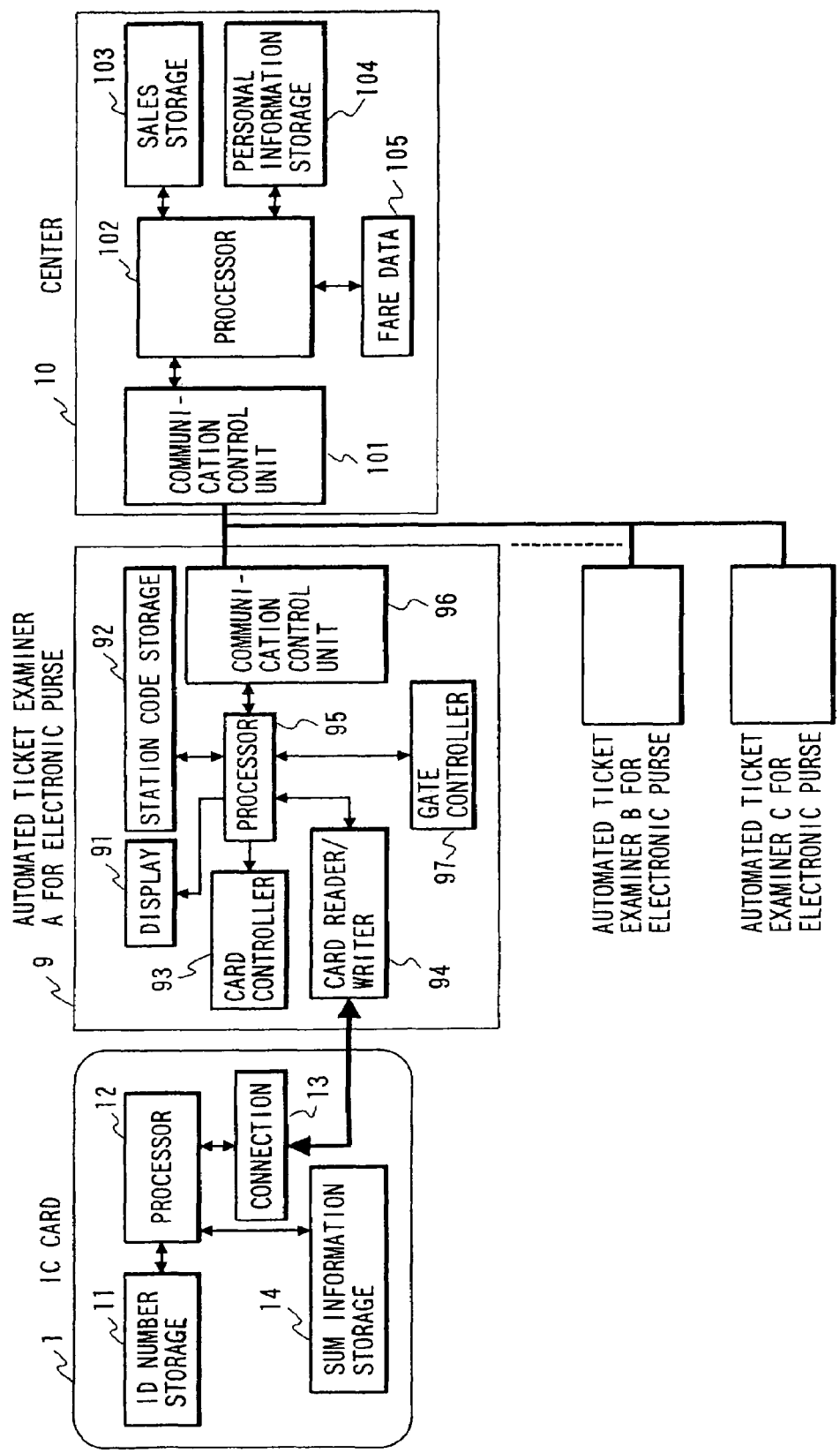
FIG. 9 is a block diagram showing a third embodiment of an electronic purse loan system according to the present invention.

FIG. 9 is a block diagram showing a third embodiment of an electronic purse loan system according to the present invention in a case where the present invention is utilized for an automatic ticket examiner. A reference number 1 denotes an IC card, 9 denotes an automatic ticket examiner for an electronic purse and 10 denotes a center. The automatic ticket examiner for an electronic purse 9 has a display, a station code storage 92, a card controller 93, a card reader/writer 94, a processor 95, a communication control processor 96 and a gate controller 97. The center 10 includes a communication control unit 101, a processor 102, a sales storage 103, a personal information storage 104 and a fare data storage 105.

FIG. 10 shows an example of a personal information storage for the automatic ticket examiner shown in FIG. 9, wherein a reference number 110 denotes the personal information storage for the automatic ticket examiner, 111 denotes an entraining station code storage and the other portions have the same reference number as assigned to a corresponding portion in FIG. 5.

Figure 11:
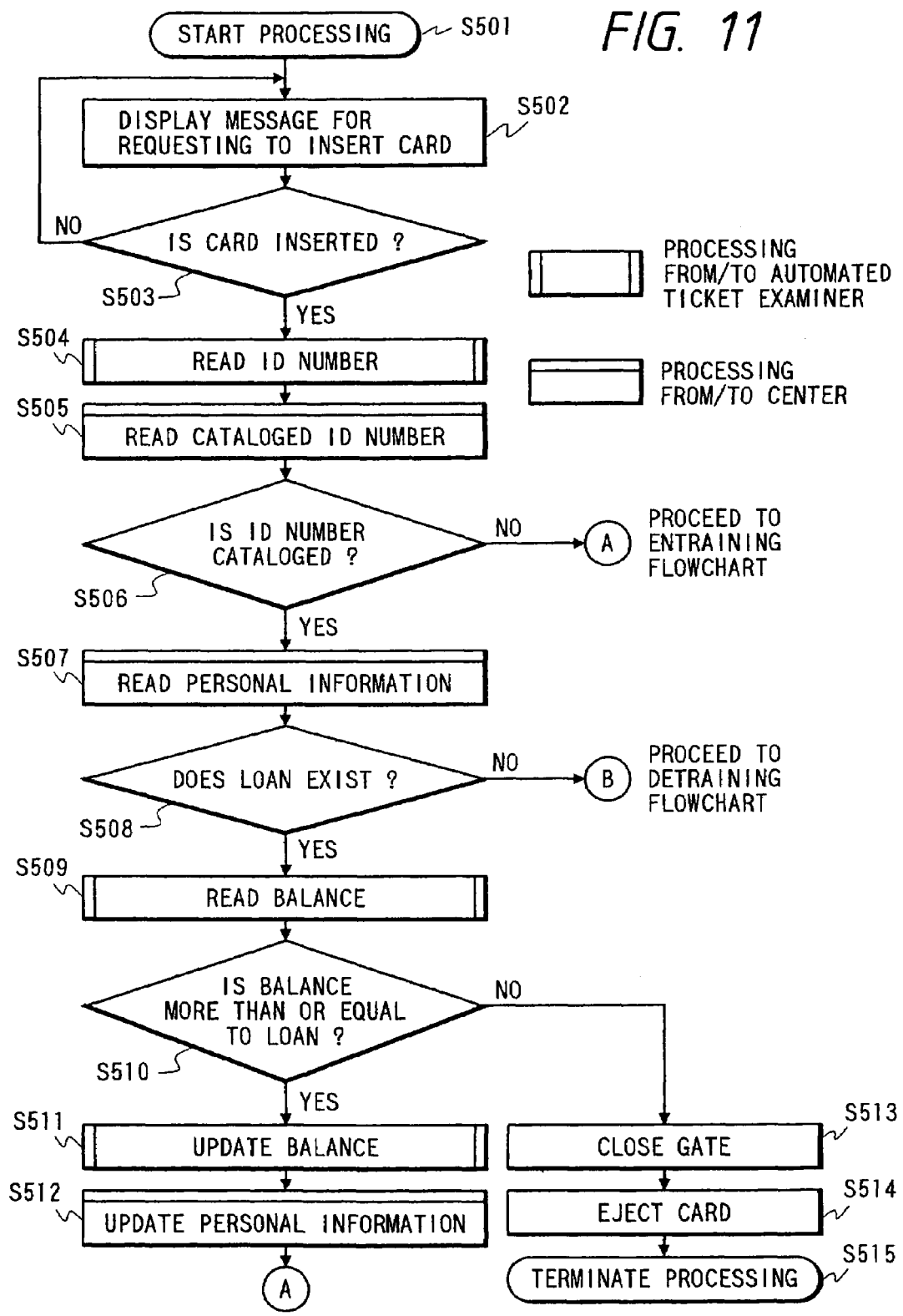
FIG. 11 is a flowchart showing an example of the basic operation in the electronic purse loan system shown in FIG. 9.

FIG. 11 is a flowchart showing the basic processing in this embodiment.

When the owner of an IC card 1 inserts the IC card 1 into the slot for an IC card in the automatic ticket examiner 9 for an electronic purse, which is in the state of waiting for an input in steps S502 and S503, as shown in FIGS. 9 and 11, to pay a fare by electronic money transfer, the connection 13 of the IC card 1 is connected to the card reader/writer 94 by the card controller 93 in a step S503.

When the IC card 1 is inserted, the ID number is first read from the IC card 1 to determine whether the user is entraining or detraining. That is, after the ID number of this IC card 1, as stored in the ID number storage 13 of the IC card 1, is read by the card reader/writer 94 and is processed by the processor 95, it is supplied to the processor 102 of the center 10 via the communication control units 96 and 101 in a step S504. The ID numbers cataloged in an ID number storage 60 shown in FIG. 10 in the personal information storage 104 in the center 10, if any, are read in a step S505, and the ID number read from the IC card 1 is compared with these ID numbers in a step S506.

Figures 12A, 12B:
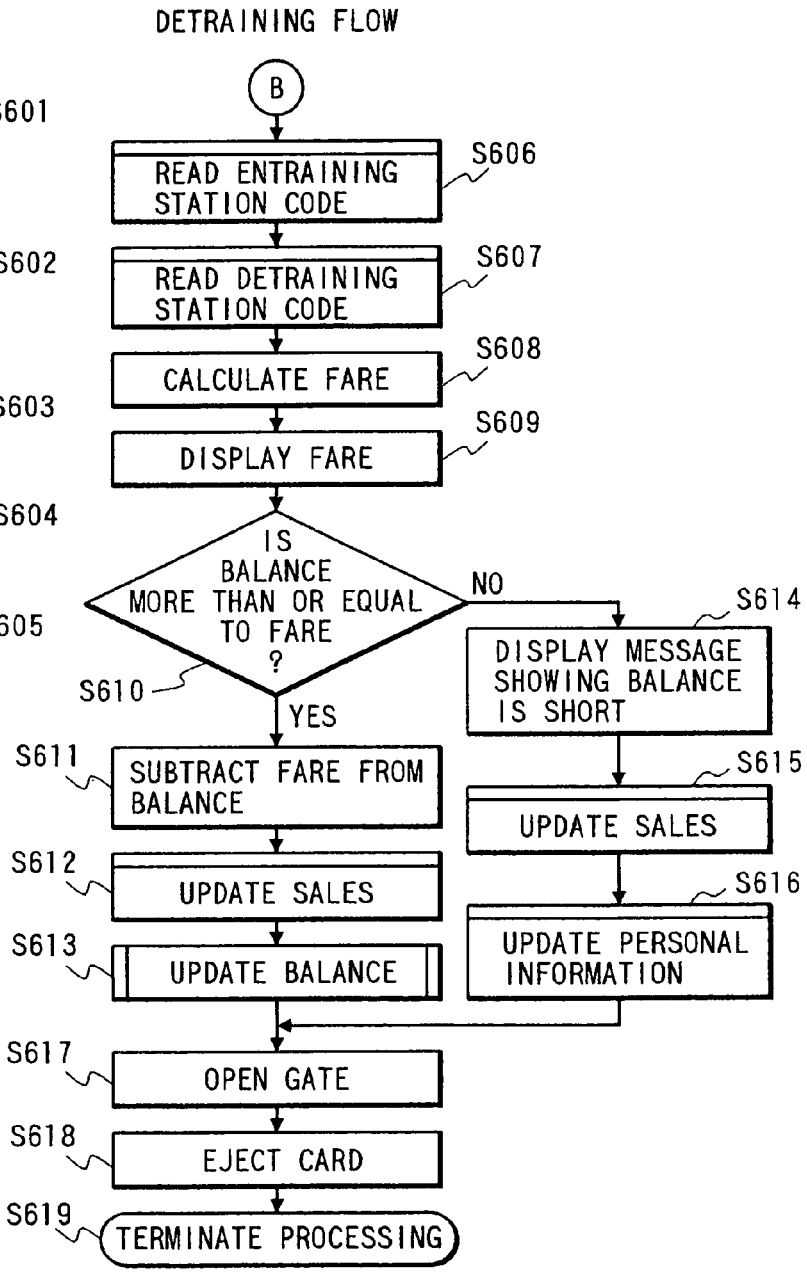
FIG. 12 is a flowchart showing the operation at the time of entraining and detraining in the flowchart shown in FIG. 11.

As a result, if the ID number of the IC card 1 is not cataloged, the owner of this IC card 1 is identified as an incoming passenger, and so processing proceeds in step S506 to an entraining process flowchart shown in FIG. 12(a); and, if the ID number of this IC card 1 is cataloged, the owner of this IC card 1 is identified as an outgoing passenger or a passenger who may already have a current loan. Further, to judge whether a user whose ID number is cataloged is detraining or is an entraining passenger that has a loan, the information stored in a loan amount storage 61 shown in FIG. 10 in the personal information storage 104 in the center 10 is read in a step S507, and it is judged from this information in a step S508 whether the user has a loan. If the user has a loan, the processing for clearing the loan is performed, and since the user is an ongoing passenger, processing proceeds to the entraining flowchart shown in FIG. 12(a).

If the user has a loan, the current balance is read from the sum information storage 14 of the IC card 1 by the card reader/writer 94 to clear off the loan automatically and is supplied to the processor 102 of the center 10 via the communication control processors 96 and 101 in a step S509. In this regard, the sum of the loan stored in the loan storage 61 shown in FIG. 10 in the personal information storage 104 and the balance are compared in a step S510. If it is found that the balance is more than or equal to the loan, the sum of the loan is subtracted from the balance, a new balance is written into the sum information storage 14 of the IC card 1 by the card reader/writer 94 in a step S511, the personal information storage 104 in the center 10 is reset and clearing of the loan is completed in a step S512. If it is found that the balance is less than the loan amount in the step S510, a gate for entrance is shut by the gate controller 97 of the automatic ticket examiner 9 for an electronic purse in a step S513, the IC card 1 is ejected by the card controller 93 in a step S514 and the user is prevented from entering the station in a step S515.

FIG. 12(a) is a flowchart showing an example of the basic processing for entraining in this third embodiment, and FIG. 12(b) is a flowchart showing an example of the basic processing for detraining.

In the case of entraining, the ID number read from the ID number storage 11 of the IC card 1 is cataloged in the ID number storage 60 in the personal information storage 104 in the center 10 in a step S601, as shown in FIG. 12(a). Similarly, the station code stored in the station code storage 92 in the automatic ticket examiner 9 for an electronic purse is written into the entraining station code storage 111 in a step S602. The gate for entrance is opened by the gate controller 97 in a step S603, the IC card 1 is ejected from the automatic ticket examiner 9 for an electronic purse by the card controller 93 in a step S604 and the processing for entrance is completed in a step S605. However, at this time, no payment is made.

In the case of detrainment, the information stored in the entraining station code storage 111 shown in FIG. 10 in the personal information storage 104 in the center 10 is read in a step S606, as shown in FIG. 12(b), and similarly, the detraining station code is read from the station code storage 92 in the automatic ticket examiner 9 for an electronic purse in a step S607. The charge corresponding to the entrained station is read from fare data stored in the center 10 in a step S608 and the charge is displayed on the display 91 of the automatic ticket examiner 9 for an electronic purse in a step S609.

Data is read from the sum information storage 14 of the IC card 1 by the card reader/writer 94 and is compared with the above-described charge in a step S610. As a result, if the balance is more than the charge, processing proceeds for normal payment, and if the balance is less than the charge, processing proceeds for establishing a loan. In the processing for normal payment, the charge is subtracted from the balance in a step S611, the charge is added to the sales storage 103 in the center 10 in a step S612 and a new balance is written into the sum information storage 14 in a step S613. Thus, payment is completed, the gate is opened by the gate controller 97 in a step S618, the IC card 1 is ejected from the automatic ticket examiner 9 for an electronic purse by the card controller 93 in a step S619 and the processing is ended in a step S620.

If it is found that the balance is short in the step S610, a loan is automatically made. That is, a message showing that the balance is short is displayed on the display 91 of the automatic ticket examiner 9 for an electronic purse in a step S614 and the charge is added to the sales storage 103 in a step S615. In this case, the total charge is loaned. The ID number of the IC card 1 is written into the ID number storage 60 shown in FIG. 10 in the personal information storage 104 in the center 10, the sum of the loan is written into the loan storage 61 shown in FIG. 10 and the loan date is written into the loan date storage 62 shown in FIG. 10 in a step S616. Hereby, the processing for a loan is completed, the gate is opened in a step S617, then the IC card 1 is ejected in a step S618 and the processing is ended in a step S619.

So far a case wherein a loan has been made once is described; however, in this embodiment a loan may be made plural times by setting the upper limit of a loan and the term of repayment, or the times of a loan, in the personal information storage 104. The total charge may be loaned or only the shortfall may be loaned. Further, data exchange between the IC card 1 and the automatic ticket examiner 9 for an electronic purse may be made without connection.

Figure 13:
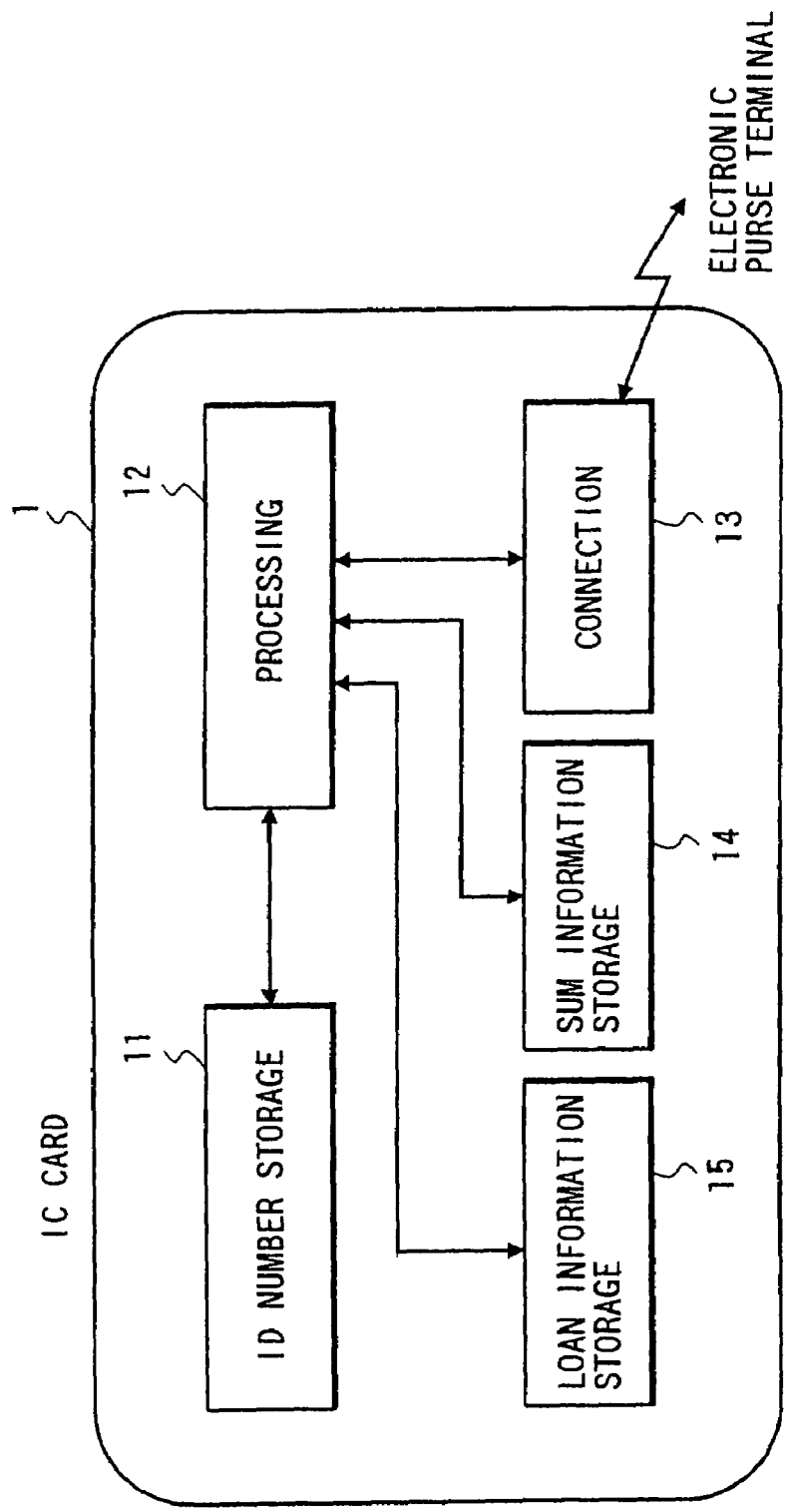
FIG. 13 is a block diagram showing another example of an IC card in the electronic purse loan system according to the present invention.

FIG. 13 shows an example in case wherein electronic money information relating to the sum of a loan is stored in the above-described IC card 1. The reference number 15 denotes a loan information storage. In this case, since personal information, such as the sum of a loan, is stored in an IC card, the security of the electronic money information can be secured.

We claim:

1. An electronic purse loan off-line device for use in a system including said electronic purse loan off-line device, an integrated circuit (IC) card, a bank or center which provides a loan of an amount of money to the user of the IC card and a commercial product or service provider that manages a commercial transaction with the user of the IC card, said electronic purse loan off-line device comprising:
   an IC card reader/writer which reads information stored in said IC card and write information to said IC card,
   wherein said information is stored on said IC card in rewritable memory including a balance information storage which stores electronic money information representing a balance of said loan and a loan information storage which stores information representing a loan and information regarding said loan including an upper limit of said loan, transactions using said loan, dates of said transactions, and repayment terms of said loan; and
   a processor which, when a commercial transaction is made with a commercial product or server provider, subtracts an amount of money to be paid for said commercial transaction from said balance information storage;
   wherein said IC card reader/writer writes information representing a loan of an amount of money from a bank or center to the user of the IC card and information regarding said loan into said loan information storage of said IC card when said electronic money information representing a balance is less than said amount of money to be paid for the commercial transaction,
   wherein said processor checks said information representing a loan stored in said IC card and inhibits the commercial transaction if the amount of money to be paid for the commercial transaction is greater than a predetermined amount of money of said information representing a loan,
   wherein payment of the commercial transaction is performed off-line without being connected to said bank or center.

2. An electronic purse loan off-line device according to claim 1, wherein said processor checks whether or not said IC card is registered.

3. An electronic purse loan off-line device according to claim 1, wherein said IC card reader/writer reads from/writes to the information stored in said IC card without contacting said IC card.

4. An electronic purse loan off-line device according to claim 1, further comprising a display which displays information indicating that said electronic money information representing a balance is less than said amount of money to be paid for said commercial transaction.

5. An electronic purse loan off-line device for use in a system including said electronic purse loan off-line device, an integrated circuit (IC) card, a bank or center which provides a loan of an amount of money to the user of the IC card and a commercial product or service provider that manages a commercial transaction with the user of the IC card, said electronic purse loan off-line device comprising:
   an IC card reader/writer which reads information stored in said IC card and writes information to said IC card,
   wherein said information is stored on said IC card in rewritable memory including a balance information storage which stores electronic money information representing a balance of said loan and a loan information storage which stores information representing a loan and information regarding said loan including an upper limit of said loan, transactions using said loan, dates of said transactions, and repayment terms of said loan; and
   a processor which, when a commercial transaction is made with a commercial product or service provider, subtracts an amount of money to be paid for said commercial transaction from said balance information storage;
   wherein said IC card reader/writer writes information representing a loan of an amount of money from a bank or center to the user of the IC card and information regarding said loan into said loan information storage when said electronic money information representing a balance is less than said amount of money to be paid for the commercial transaction,
   wherein said processor checks said information representing a loan stored in said loan information storage of said IC card and inhibits a loan if the term of the loan is greater than a predetermined term, and
   wherein payment of the commercial transaction is performed off-line without being connected to said bank or center.

6. An electronic purse loan off-line device according to claim 5, wherein said processor checks whether or not said IC card is registered.

7. An electronic purse loan off-line device according to claim 5, wherein said IC card reader/writer reads from/writes to the information stored in said IC card without contacting said IC card.

8. An electronic purse loan off-line device according to claim 5, further comprising a display which displays information indicating that said electronic money information representing a balance is less than said amount of money to be paid for said commercial transaction.

9. An Integrated Circuit (IC) card used in an electronic purse loan off-line system including an electronic purse loan off-line device, said IC card, a bank or center which provides a loan of an amount of money to the user of the IC card and a commercial product or service provider that manages a commercial transaction with the user of the IC card, said IC card comprising:
   a balance memory which stores electronic data representing a money balance;
   a loan memory which stores electronic data of a loan; and
   a processor which writes electronic data of a loan of an amount of money to the user of the IC card into said loan memory when said electronic data representing a money balance is less than the amount of money required for a commercial transaction to be made with a commercial product or service provider,
   wherein said electronic data of a loan of an amount of money from a bank or center to a user of the IC card includes electronic money information representing the upper limit of a loan and information regarding said loan including an upper limit of said loan, transactions using said loan, dates of said transactions and repayment terms of said loan, and
   wherein said electronic data of said loan is used up to the upper limit of the loan when the commercial transaction exceeds said money balance, and wherein payment of the commercial transaction is performed off-line without being connected to said bank or center.

10. An IC card according to claim 9, further comprising:
a data input/output circuit which inputs/outputs electronic data representing money from/to an external terminal in an electric purse loan off-line system without contact.

11. An IC card according to claim 9, further comprising:
a connector which inputs/outputs electric money data from/to an external terminal in said electric purse loan off-line system.

12. An IC card according to claim 9, further comprising:
an ID number memory which stores a 10 number registered for a person.

13. An IC card according to claim 9, wherein said transaction is a train fare or a bus fare.

14. An Integrated Circuit (IC) card used in an electronic purse loan off-line system including an electronic purse loan off-line device, said IC card, a bank or center which provides a loan of an amount of money to the user of the IC card and a commercial product or service provider that manages a commercial transaction with the user of the IC card, said IC card comprising:
a balance memory which stores electronic data representing a money balance;
a loan memory which stores electronic data of a loan of an amount of money from a bank or center to the user of the IC card and information regarding said loan including an upper limit of said loan, transactions using said loan, dates of said transactions and repayment terms of said loan; and
a processor which writes electronic data of a loan into said loan memory when said electronic data representing a money balance is less than the amount of money required for a commercial transaction to be made with a commercial product or service provider,
wherein said electronic data of a loan includes information representing the term limit of a loan,
wherein said electronic data of the loan is used in accordance with the term limit of the loan when the commercial transaction exceeds the money balance, and
wherein payment of the commercial transaction is performed off-line without being connected to said bank or center.

15. An IC card according to claim 14, further comprising:
a data input/output circuit which inputs/outputs electronic data representing money from/to an external terminal in an electric purse loan system without contact.

16. An IC card according to claim 14, further comprising:
a connector which inputs/outputs electric money data from/to an external terminal in said electric purse loan off-line system.

17. An IC card according to claim 14, further comprising:
an ID number memory which stores a 10 number registered for a person.

18. An IC card according to claim 14, wherein said commercial transaction is a train fare or a bus fare.

19. An electronic purse loan off-line system including an electronic purse loan off-line device, an integrated circuit (IC) card, a bank or center which provides a loan of an amount of money to the user of the IC card and a commercial product or service provider that manages a commercial transaction with the user of the IC card, said electronic purse loan off-line system comprising:
(a) a terminal having:
an IC card reader/writer which reads information stored in said IC card and writes information to said IC card,
wherein said information stored on said IC card in rewritable memory including a balance information storage which stores electronic money information representing a balance of said loan and a loan information storage which stores information representing a loan and information regarding said loan including an upper limit of said loan, transactions using said loan, dates of said transactions, and repayment terms of said loan, and
a processor which, when a commercial transaction is made with a commercial product or service provider, subtracts an amount of money to be paid for said commercial transaction from said balance information storage; and
(b) a center having:
a storage which stores money information and loan information transmitted from said terminal,
wherein said terminal writes electronic information of a loan of an amount of money from a bank or center to the user of the IC card and information regarding said loan into said loan information storage and transmits loan information corresponding to said loan to said center when said electronic information representing a money balance is less than the amount of money to be paid for said commercial transaction, and said storage of said center stores said loan information, and
wherein payment of the commercial transaction is performed off-line without being connected to said bank or center.

20. An electronic purse loan off-line system according to claim 19, further comprising a center processor in said center, wherein said center processor liquidates a loan when the next transaction of said IC card having a loan information occurs.

21. An electronic purse loan off-line system according to claim 19, further comprising a center processor in said center, wherein said center processor checks data information relating to a loan and approves the loan when said date information is within a predetermined term.

22. An electronic purse loan off-line system according to claim 19, further comprising a center processor in said center, wherein said center processor checks said information representing a loan and approves a loan when said information is within a predetermined upper limit.

23. A method of carrying out a transaction using an Integrated Circuit (IC) card including an electronic purse loan off-line device, said IC card, a bank or center which provides a loan of an amount of money to the user of the IC card and a commercial product or service provider that manages a commercial transaction with the user of the IC card, said method comprising:
storing electronic data representing a money balance in a balance memory;
storing electronic data of a loan of an amount of money from a bank or center to the user of the IC card and information regarding said loan in a loan memory including an upper limit of said loan, transactions using said loan, dates of said transactions and repayment terms of said loan; and
writing electronic data of a loan into said loan memory when said electronic data representing a money balance is less than the amount of money required for a commercial transaction made with a commercial product or service provided,
wherein said electronic data of said loan is used up to the upper limit of the loan when the commercial transaction exceeds said money balance, and wherein payment of the commercial transaction is performed off-line without being connected to said bank or center.

24. A method according to claim 23, wherein electronic data representing money is input from and/or output to an external terminal through a data input/output circuit in said IC card.

25. A method according to claim 23, wherein said external terminal inputs said electronic data of a loan into said loan memory of said IC card without first contacting any other device.

26. An Integrated Circuit (IC) card used in an electronic purse loan off-line system including an electronic purse loan off-line device, said IC card, a bank or center which provides a loan of an amount of money to the user of the IC card and a commercial product or service provider that manages a commercial transaction with the user of the IC card, said IC card comprising:

a rewritable memory which stores electronic data representing a money balance and electronic data of a loan including an amount of money loaned from a bank or center to the user of the IC card and information regarding said loan including an upper limit of said loan, transactions using said loan, dates of said transactions and repayment terms of said loan;

a processor which writes said electronic data of the loan into said memory when said electronic data representing the money balance is less than an amount of money required for a commercial transaction with commercial product or service provider, and wherein payment of the commercial transaction is performed off-line without being connected to said bank or center.

27. An IC card according to claim 26, further comprising:
a data input/output circuit which inputs/outputs electronic data representing money from/to an external terminal in an electric purse loan off-line system without contact.

28. An IC card according to claim 26, further comprising:
a connector which inputs/outputs electric money data from/to an external terminal in said electric purse loan off-line system.

29. An IC card according to claim 26, further comprising:
an ID number memory which stores a ID number registered for a person.

30. An IC card according to claim 26, wherein said commercial transaction is a train fare or a bus fare.

31. An Integrated Circuit (IC) card used in an electronic purse loan off-line system including an electronic purse loan off-line device, said IC card, a bank or center which provides a loan of an amount of money to the user of the IC card and a commercial product or service provider that manages a commercial transaction with the user of the IC card, said IC card comprising:

a rewritable memory which stores money information, including money information representing a loan including an amount of money loaned from a bank or center to the user of the IC card and information regarding said loan including an upper limit of said loan, transactions using said loan, dates of said transactions and repayment terms of said loan;

a processor which writes said money information representing the loan into said memory when money information representing a balance is less than the amount of money to be paid for a commercial transaction with commercial product or service provider, and wherein payment of the commercial transaction is performed off-line without being connected to said bank or center.

32. An IC card according to claim 31, further comprising:
a data input/output circuit which inputs/outputs electronic data representing money from/to an external terminal in an electric purse loan off-line system without contact.

33. An IC card according to claim 31, further comprising:
a connector which inputs/outputs electric money data from/to an external terminal in said electric purse loan off-line system.

34. An IC card according to claim 31, further comprising:
an ID number memory which stores a ID number registered for a person.

35. An IC card according to claim 31, wherein said commercial transaction is a train fare or a bus fare.

36. An Integrated Circuit (IC) card used in an electronic purse loan off-line system including an electronic purse loan off-line device, said IC card, a bank or center which provides a loan of an amount of money to the user of the IC card and a commercial product or service provider that manages a commercial transaction with the user of the IC card, said IC card comprising:

a loan information storage which stores information representing a loan including an amount of money loaned from a bank or center to the user of the IC card and information regarding said loan including an upper limit of said loan, transactions and repayment terms of said loan;

a processor which writes said information representing the loan into said loan information storage when an electronic money information representing a balance is less than the amount of money to be paid for a commercial transaction with commercial product or service provider, and wherein payment of the commercial transaction is performed off-line without being connected to said bank or center.

37. An IC card according to claim 36, further comprising:
a data input/output circuit which inputs/outputs electronic data representing money from/to an external terminal in an electric purse loan off-line system without contact.

38. An IC card according to claim 36, further comprising:
a connector which inputs/outputs electric money data from/to an external terminal in said electric purse loan off-line system.

39. An IC card according to claim 36, further comprising:
an ID number memory which stores a ID number registered for a person.

40. An IC card according to claim 36, wherein said commercial transaction is a train fare or a bus fare.

41. An Integrated Circuit (IC) card used in an electronic purse loan off-line system including said electronic purse loan off-line device, said IC card, a bank or center which provides a loan of an amount of money to the user of the IC card and a commercial product or service provider that manages a commercial transaction with the user of the IC card, said IC card comprising:

a loan information storage which stores information representing a loan of an amount of money from a bank or center to the user of the IC card and information regarding said loan including an upper limit of said loan, transactions using said loan, dates of said transactions and repayment terms of said loan; and a processor which writes said information representing a loan into said loan information storage when an electronic money information representing a balance is less than the amount of money to be paid for a commercial transaction with commercial product or service provider, whereby payment of the commercial transaction is performed without being connected to said bank or a-center.

* * * * *